United States Patent
Kim et al.

(10) Patent No.: US 9,062,164 B2
(45) Date of Patent: Jun. 23, 2015

(54) POLYSILOXANE-POLYCARBONATE COPOLYMER AND METHOD OF MANUFACTURING THE SAME

(71) Applicant: SAMYANG CORPORATION, Seoul (KR)

(72) Inventors: Jae Hyun Kim, Daejeon (KR); Kyung Moo Shin, Seoul (KR); Hong Chol Rhee, Daejeon (KR); Yun Ju Chang, Daejeon (KR); Sun Chul Jin, Namyangju (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 14/351,422

(22) PCT Filed: Oct. 26, 2012

(86) PCT No.: PCT/KR2012/008843
§ 371 (c)(1),
(2) Date: Apr. 11, 2014

(87) PCT Pub. No.: WO2013/066002
PCT Pub. Date: May 10, 2013

(65) Prior Publication Data
US 2014/0249280 A1  Sep. 4, 2014

(30) Foreign Application Priority Data

Oct. 31, 2011 (KR) ................ 10-2011-0112324

(51) Int. Cl.
C08G 77/04 (2006.01)
C08G 77/54 (2006.01)
C08G 77/448 (2006.01)
C08G 64/18 (2006.01)
C08G 77/48 (2006.01)
C08G 77/52 (2006.01)
C08G 77/00 (2006.01)

(52) U.S. Cl.
CPC .............. *C08G 77/54* (2013.01); *C08G 77/448* (2013.01); *C08G 64/186* (2013.01); *C08G 77/48* (2013.01); *C08G 77/52* (2013.01)

(58) Field of Classification Search
USPC ............................................ 528/25; 556/440
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Schnell et al. | |
| 3,153,008 A | 10/1964 | Fox | |
| 3,334,154 A | 8/1967 | Kim | |
| 6,657,018 B1 | 12/2003 | Hoover | |
| 7,994,254 B2 | 8/2011 | Srinivasan et al. | |
| 8,802,804 B2 * | 8/2014 | Kim et al. | 528/25 |
| 2003/0105226 A1 | 6/2003 | Cella et al. | |
| 2006/0030647 A1 | 2/2006 | Ebeling et al. | |
| 2009/0088509 A1 | 4/2009 | Adoni et al. | |
| 2012/0309922 A1 | 12/2012 | Kim et al. | |

FOREIGN PATENT DOCUMENTS

WO   WO 2011/122767 A2   10/2011

OTHER PUBLICATIONS

International Search Report issued in PCT/KR2012/008843 mailed Feb. 28, 2013.

* cited by examiner

*Primary Examiner* — Terressa Boykin
(74) *Attorney, Agent, or Firm* — Birch, Stewart, Kolasch & Birch, LLP

(57) ABSTRACT

The present invention relates to a polysiloxane-polycarbonate copolymer and a method of manufacturing the same. More specifically, the present invention relates to a polysiloxane-polycarbonate copolymer in which the molecular weight of the siloxane monomer constituting the copolymer is maintained in a specifically high level and thus excellent low-temperature impact resistance can be achieved even with low siloxane content, and the viscosity of the copolymer is maintained in a low level and thus flowability and moldability can be improved; and a method of manufacturing the same.

7 Claims, No Drawings

POLYSILOXANE-POLYCARBONATE COPOLYMER AND METHOD OF MANUFACTURING THE SAME

TECHNICAL FIELD

The present invention relates to a polysiloxane-polycarbonate copolymer and a method of manufacturing the same. More specifically, the present invention relates to a polysiloxane-polycarbonate copolymer in which the molecular weight of the siloxane monomer constituting the copolymer is maintained in a specifically high level and thus excellent low-temperature impact resistance can be achieved even with low siloxane content, and the viscosity of the copolymer is maintained in a low level and thus flowability and moldability can be improved; and a method of manufacturing the same.

BACKGROUND ART

Polycarbonate has good mechanical properties such as tensile strength, impact resistance, etc. and also has good dimensional stability, heat resistance and optical transparency. Thus, it has been extensively used in many industries. However, although polycarbonate has good impact resistance at room temperature, its impact resistance rapidly becomes worse at low temperature.

To improve such a disadvantage, various copolymers have been researched and it has been known that polysiloxane-polycarbonate copolymer has relatively good impact resistance at low temperature. However, polysiloxane-polycarbonate copolymers that are currently used conventionally require a high amount of siloxane to show low-temperature impact resistance, and thus the manufacturing costs are inevitably increased. In addition, they have a problem of deterioration in flowability and moldability due to increase of the molecular weight of the copolymer.

Accordingly, there is a need to develop a polysiloxane-polycarbonate copolymer which can exhibit excellent low-temperature impact resistance even with low siloxane content, while having improved flowability and moldability.

PRIOR ART DOCUMENT

Patent Document

US 2003/0105226 A

DISCLOSURE OF INVENTION

Technical Problem

The present invention is intended to solve the problems involved in the prior arts as stated above. The technical purpose of the present invention is to provide a polysiloxane-polycarbonate copolymer exhibiting excellent low-temperature impact resistance even with low siloxane content, while having improved flowability and moldability.

Solution to Problem

The present invention provides a polysiloxane-polycarbonate copolymer comprising, as repeating units, a hydroxy-terminated siloxane of the following chemical formula 1a or chemical formula 1 and a polycarbonate block of the following chemical formula 4, wherein the number average molecular weight of the hydroxy-terminated siloxane is from 2,500 to 15,000:

[Chemical formula 1a]

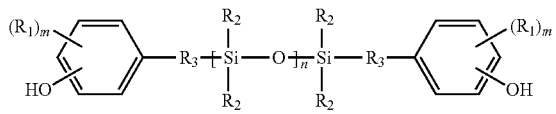

[Chemical formula 1]

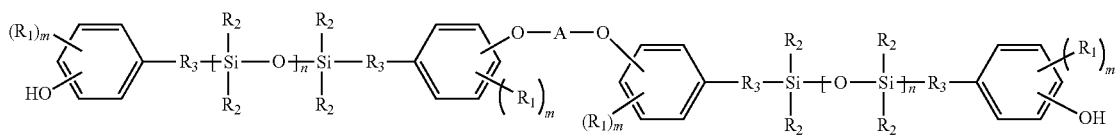

In another aspect, the present invention provides a method for preparing the polysiloxane-polycarbonate copolymer, comprising: a step of mixing a hydroxy-terminated siloxane having a number average molecular weight of from 2,500 to 15,000 and an oligomeric polycarbonate; a step of reacting the hydroxy-terminated siloxane and the oligomeric polycarbonate under an interfacial reaction condition to form a polysiloxane-polycarbonate intermediate; and a step of polymerizing the intermediate by using a first polymerization catalyst.

Advantageous Effects of Invention

By comprising siloxane having a controlled molecular weight (or length) in a specifically high level, the polysiloxane-polycarbonate copolymer according to the present invention can effectively exhibit low-temperature impact resistance—which is not shown when the siloxane content is low—and the viscosity average molecular weight of the copolymer decreases, resulting in the improvement of flowability in extrusion/injection molding and the reduction of cooling time. In addition, manufacturing costs can be lowered according to the decrease of the necessary amount of siloxane for securing low-temperature impact resistance.

MODE FOR THE INVENTION

Hereinafter, the present invention will be described more specifically. The purpose, features and advantages of the present invention will be easily understood through the following embodiments. The present invention is not limited to the embodiments as explained herein and may be manifested in other forms. The embodiments introduced herein are provided in order to make the disclosed contents thorough and complete, and to convey the spirit of the present invention sufficiently to a person skilled in the art. Thus, the present invention is not limited to the following embodiments and examples.

The term "reaction product" as used herein means a substance that is formed by reacting two or more reactants.

In addition, although the terms "first," "second" and the like are used herein for the description of polymerization catalysts, the polymerization catalysts are not limited by these terms. These terms are just used to distinguish the polymerization catalysts from each other. For example, a first polymerization catalyst and a second polymerization catalyst may be of the same kind of catalyst or different kinds of catalyst.

Furthermore, in the chemical formulas described herein, although the English character "R" used for representing hydrogen, halogen atom and/or hydrocarbon group, etc. has a numerical subscript, "R" is not limited by such a subscript. "R" independently represents hydrogen, halogen atom and/or hydrocarbon group, etc. For example, even if two or more "R"s have the same numerical subscript, such "R"s may represent the same hydrocarbon group or different hydrocarbon groups. Also, even if two or more "R"s have different numerical subscripts, such "R"s may represent the same hydrocarbon group or different hydrocarbon groups.

[Polysiloxane-Polycarbonate Copolymer (Si-PC)]

The polysiloxane-polycarbonate copolymer of the present invention comprises, as repeating units, a hydroxy-terminated siloxane of the following chemical formula 1a or chemical formula 1, and a polycarbonate block of the following chemical formula 4.

[Chemical formula 1a]

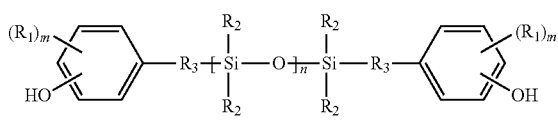

In the above chemical formula 1a, $R_1$ independently represents hydrogen atom, halogen atom, hydroxy group, or alkyl group, alkoxy group or aryl group having 1 to 20 carbon atoms. For example, the halogen atom may be Cl or Br, and the alkyl group may be an alkyl group having 1 to 13 carbon atoms such as methyl, ethyl or propyl group. In addition, for example, the alkoxy group may be an alkoxy group having 1 to 13 carbon atoms such as methoxy, ethoxy or propoxy group, and the aryl group may be an aryl group having 6 to 10 carbon atoms such as phenyl, chlorophenyl or tolyl group.

$R_2$ independently represents hydrocarbon group having 1 to 13 carbon atoms or hydroxy group. For example, $R_2$ may be alkyl or alkoxy group having 1 to 13 carbon atoms, alkenyl or alkenyloxy group having 2 to 13 carbon atoms, cycloalkyl or cycloalkoxy group having 3 to 6 carbon atoms, aryloxy group having 6 to 10 carbon atoms, aralkyl or aralkoxy group having 7 to 13 carbon atoms, or alkaryl or alkaryloxy group having 7 to 13 carbon atoms.

$R_3$ independently represents alkylene group having 2 to 8 carbon atoms.

The subscript "m" independently represents an integer of 0 to 4.

The subscript "n" independently represents an integer of 30 to 200, preferably 40 to 170, and more preferably 50 to 120.

In one embodiment, as a hydroxy-terminated siloxane of chemical formula 1a, a siloxane monomer available from Dow Corning

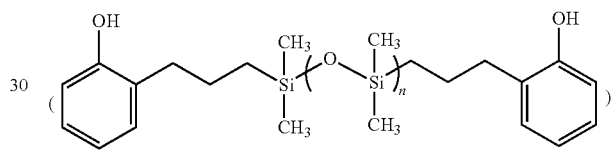

may be used, but it is not limited thereto,

[Chemical formula 1]

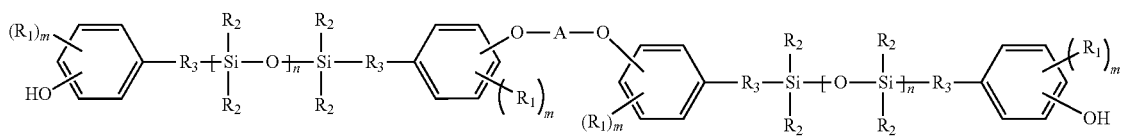

In the above chemical formula 1, $R_1$, $R_2$, $R_3$ and m are the same as defined in chemical formula 1a above, and n independently represents an integer of 15 to 100, preferably 20 to 80, and more preferably 25 to 60.

"A" represents a structure of the following chemical formula 2 or 3.

[Chemical formula 2]

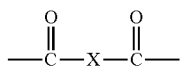

In the chemical formula 2,

X represents Y or NH—Y—NH, wherein Y represents linear or branched aliphatic group having 1 to 20 carbon atoms, cycloalkylene group (for example, cycloalkylene group having 3 to 6 carbon atoms), or mono- or polycyclic arylene group having 6 to 30 carbon atoms and being unsubstituted or substituted with halogen atom, alkyl group, alkoxy group, aryl group or carboxyl group. For example, Y may be an aliphatic group that is unsubstituted or substituted with halogen atom, an aliphatic group that contains oxygen, nitrogen or sulfur atom in its main chain, or an arylene group that can be derived from bisphenol A, resorcinol, hydroquinone or diphenylphenol. Y can be represented, for example, by one of the following chemical formulas 2a to 2h.

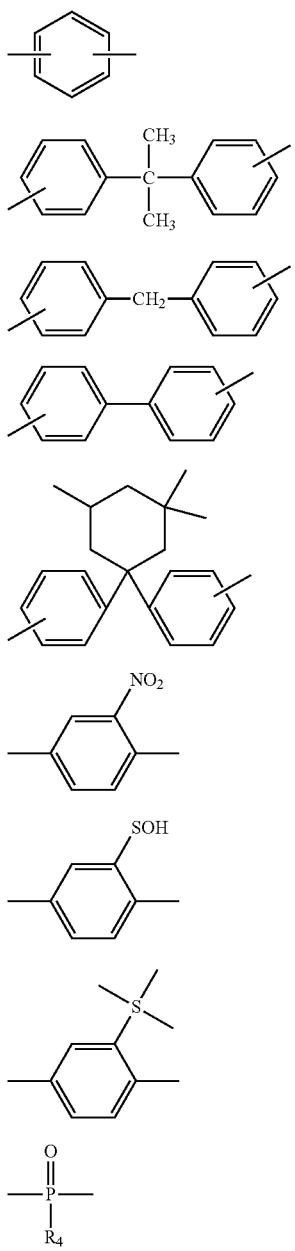

[Chemical formula 2a]

[Chemical formula 2b]

[Chemical formula 2c]

[Chemical formula 2d]

[Chemical formula 2e]

[Chemical formula 2f]

[Chemical formula 2g]

[Chemical formula 2h]

[Chemical formula 3]

In the above chemical formula 3, $R_4$ represents an aromatic hydrocarbon group or aromatic/aliphatic mixed-type hydrocarbon group having 6 to 30 carbon atoms, or an aliphatic hydrocarbon group having 1 to 20 carbon atoms. $R_4$ may have a structure containing halogen, oxygen, nitrogen or sulfur as well as carbon atom(s). For example, $R_4$ may be phenyl, chlorophenyl or tolyl (preferably, phenyl).

In one embodiment, the hydroxy-terminated siloxane of chemical formula 1 may be a reaction product of a hydroxy-terminated siloxane of the above chemical formula 1a (wherein n is an integer of 15 to 100) and an acyl compound.

The acyl compound may have, for example, an aromatic structure, an aliphatic structure, or a mixed type structure comprising both aromatic and aliphatic forms. When the acyl compound is of an aromatic structure or a mixed type structure, it can have 6 to 30 carbon atoms, and when the acyl compound is of an aliphatic structure, it can have 1 to 20 carbon atoms. The acyl compound may further comprise halogen, oxygen, nitrogen or sulfur atom.

In another embodiment, the hydroxy-terminated siloxane of the above chemical formula 1 may be a reaction product of a hydroxy-terminated siloxane of the above chemical formula 1a (wherein n is an integer of 15 to 100) and a diisocyanate compound.

The diisocyanate compound may be, for example, 1,4-phenylenediisocyanate, 1,3-phenylenediisocyanate or 4,4'-methylenediphenyl diisocyanate.

In another embodiment, the hydroxy-terminated siloxane of the above chemical formula 1 may be a reaction product of a hydroxy-terminated siloxane of the above chemical formula 1a (wherein n is an integer of 15 to 100) and a phosphorus-containing compound (e.g., an aromatic or an aliphatic phosphate compound).

The phosphorus-containing compound may have a structure of the following chemical formula 1b.

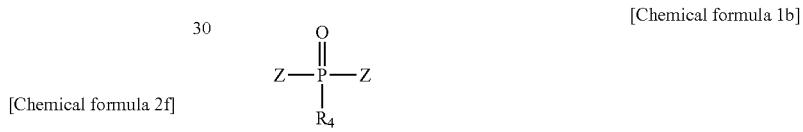

[Chemical formula 1b]

In the above chemical formula 1b, $R_4$ is the same as defined in chemical formula 3 above, and Z independently represents phosphorus, halogen atom, hydroxyl group, carboxyl group, alkyl group (having 1 to 20 carbon atoms), alkoxy group or aryl group.

The hydroxy-terminated siloxane monomer of the above chemical formula 1a or chemical formula 1 in the polysiloxane-polycarbonate copolymer according to the present invention has a number average molecular weight ($M_n$) of 2,500 to 15,000, preferably 3,000 to 13,000, and more preferably 4,000 to 9,000. If the number average molecular weight of the siloxane monomer is less than 2,500, the effect of improving low-temperature impact resistance may be insufficient as compared with the requirement of the present invention. If the number average molecular weight of the siloxane monomer is greater than 15,000, the reactivity may be lowered and thus there may be a problem in synthesizing the polysiloxane-polycarbonate copolymer with a desired molecular weight.

The polycarbonate block comprised as a repeating unit in the polysiloxane-polycarbonate copolymer according to the present invention may be represented by the following chemical formula 4.

[Chemical formula 4]

In the above chemical formula 4, $R_5$ represents aromatic hydrocarbon group having 6 to 30 carbon atoms that is unsubstituted or substituted with alkyl group having 1 to 20 carbon atoms (for example, alkyl group having 1 to 13 carbon atoms), cycloalkyl group (for example, cycloalkyl group having 3 to 6 carbon atoms), alkenyl group (for example, alkenyl group having 2 to 13 carbon atoms), alkoxy group (for example, alkoxy group having 1 to 13 carbon atoms), halogen atom or nitro.

The aromatic hydrocarbon group may be derived from a compound of the following chemical formula 4a.

[Chemical formula 4a]

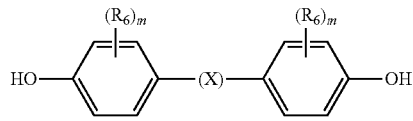

In the above chemical formula 4a,

X represents alkylene group; linear, branched or cyclic alkylene group having no functional group; or linear, branched or cyclic alkylene group comprising a functional group such as sulfide, ether, sulfoxide, sulfone, ketone, naphthyl, isobutylphenyl, etc. Preferably, X may be linear or branched alkylene group having 1 to 10 carbon atoms, or cyclic alkylene group having 3 to 6 carbon atoms.

$R_6$ independently represents hydrogen atom, halogen atom or alkyl group—for example, linear or branched alkyl group having 1 to 20 carbon atoms, or cyclic alkyl group having 3 to 20 (preferably, 3 to 6) carbon atoms.

The subscripts "n" and "m" independently represent an integer of 0 to 4.

The compound of the above chemical formula 4a may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, Resorcinol, hydroquinone, 4,4'-dihydroxyphenyl ether[bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhy-droquinone, 1,5-dihydroxynaphthalene, or 2,6-dihydroxynaphthalene, but it is not limited thereto. Among them, the representative one is 2,2-bis(4-hydroxyphenyl)propane (bisphenol A). For other functional dihydric phenols, U.S. Pat. Nos. 2,999,835; 3,028,365; 3,153,008 and 3,334,154 may be referred to. The above dihydric phenol may be used alone or in combination of two or more of them.

In case of carbonate precursor, for example, carbonyl chloride (phosgene), carbonyl bromide, bis halo formate, diphenylcarbonate, dimethylcarbonate, etc. may be used as another monomer of the polycarbonate resin.

In the polysiloxane-polycarbonate copolymer of the present invention, the amount of hydroxy-terminated siloxane is preferably 1 to 10% by weight, and more preferably 2 to 5% by weight. If the amount of hydroxy-terminated siloxane is less than 1% by weight, the effect of improving low-temperature impact resistance may be insufficient as compared with the requirement of the present invention. If the amount of hydroxy-terminated siloxane is greater than 10% by weight, physical properties such as flowability, heat resistance, transparency, etc. may be deteriorated and manufacturing costs may be disadvantageously increased. In the present invention, since the siloxane monomer having a relatively high molecular weight is used, excellent low-temperature impact resistance can be exhibited even with low siloxane content such as a level of 1 to 10% by weight.

Preferably, the polysiloxane-polycarbonate copolymer may have a viscosity average molecular weight ($M_v$) of from 15,000 to 30,000, and more preferably from 17,000 to 22,000. If the viscosity average molecular weight of the copolymer is less than 15,000, its mechanical properties may be deteriorated severely. If the viscosity average molecular weight is greater than 30,000, the melt viscosity increases and thus there may be a problem in resin processing. In the present invention, according to use of the siloxane monomer having a specifically high level of molecular weight, good low-temperature impact resistance can be secured even though the viscosity average molecular weight of the copolymer is decreased to a level of 30,000 or lower, and thus moldability under the same condition becomes better. Accordingly, molding can be smoothly conducted even though the processing temperature during extrusion/injection molding is lower than the temperature for the case of the viscosity average molecular weight of 30,000, and thus energy costs for elevating temperature and cooling time can be reduced, by which it can be expected to increase the productivity in continuous injection molding process. In addition, it can be mixed with other resins having poor heat stability and thus can be easily developed for various applications.

[Method for Preparing the Polysiloxane-Polycarbonate Copolymer]

The polysiloxane-polycarbonate copolymer of the present invention may be prepared through the steps of: mixing a hydroxy-terminated siloxane having a number average molecular weight of 2,500 to 15,000 and an oligomeric polycarbonate (for example, mixing in a weight ratio of 1:99 to 10:90) and reacting them under an interfacial reaction condition to form a polysiloxane-polycarbonate intermediate; and polymerizing the intermediate by using a first polymerization catalyst.

Preferably, the viscosity average molecular weight of the oligomeric polycarbonate used in the preparation of the polysiloxane-polycarbonate copolymer may be from 800 to 20,000, more preferably, from 800 to 15,000, and most preferably, 1,000 to 12,000. If the viscosity average molecular weight of the oligomeric polycarbonate is less than 800, the molecular weight distribution may broaden and physical properties may be deteriorated. If the viscosity average molecular weight of the oligomeric polycarbonate is greater than 20,000, the reactivity may be lowered.

In one embodiment, the oligomeric polycarbonate may be prepared by adding the above-explained dihydric phenol compound in an aqueous alkaline solution to make it in a phenol salt state, and then adding the phenol compound in a phenol salt state to dichloromethane containing injected phosgene gas for reaction. To prepare the oligomer, it is preferable to maintain the molar ratio of phosgene to bisphenol within a range of about 1:1 to 1.5:1, and more preferably 1:1 to 1.2:1. If the molar ratio of phosgene to bisphenol is less than 1, the reactivity may be lowered. If the molar ratio of phosgene to bisphenol is greater than 1.5, the molecular weight increases excessively and thus the processability may be lowered.

The above reaction of forming an oligomer may generally be conducted at a temperature range of about 15 to 60° C. In order to adjust pH of the reaction mixture, alkali metal hydroxide (for example, sodium hydroxide) may be used.

In an embodiment, the step for forming the intermediate comprises a step of forming a mixture comprising the hydroxy-terminated siloxane and the oligomeric polycarbonate, wherein the mixture may further comprise a phase transfer catalyst, a molecular weight-controlling agent and a second polymerization catalyst. In addition, the step for forming the intermediate may comprise a step of forming a mixture comprising the hydroxy-terminated siloxane and the oligomeric polycarbonate; and after the reaction of the hydroxy-terminated siloxane and the oligomeric polycarbonate is completed, a step of extracting an organic phase from the resulting mixture, wherein the step of polymerizing the intermediate may comprise a step of providing the first polymerization catalyst to the extracted organic phase.

Concretely, the polysiloxane-polycarbonate copolymer may be prepared by adding the hydroxy-terminated siloxane of the above chemical formula 1a or chemical formula 1 to a mixture of organic phase/aqueous phase containing the polycarbonate, and subsequently feeding a molecular weight-controlling agent and a catalyst.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 5.

 [Chemical formula 5]

In the above chemical formula 5,
$R^7$ represents alkyl group having 1 to 10 carbon atoms, Q represents nitrogen or phosphorus, and X represents halogen atom or $-OR_8$, wherein $R_8$ represents hydrogen atom, alkyl group having 1 to 18 carbon atoms or aryl group having 6 to 18 carbon atoms.

Concretely, the phase transfer catalyst may be, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3$ NX or $CH_3[CH_3(CH_2)_2]_3NX$, wherein X represents Cl, Br or $-OR_8$ where $R_8$ represents hydrogen atom, alkyl group having 1 to 18 carbon atoms or aryl group having 6 to 18 carbon atoms.

The amount of the phase transfer catalyst is preferably about 0.01 to 10% by weight, and more preferably 0.1 to 10% by weight based on total weight of the mixture of the hydroxy-terminated siloxane and the oligomeric polycarbonate. If the amount of the phase transfer catalyst is less than 0.01% by weight, the reactivity may be lowered. If the amount of the phase transfer catalyst is greater than 10% by weight, precipitation may happen or the transparency may be deteriorated.

In one embodiment, after the polysiloxane-polycarbonate copolymer is prepared, the organic phase dispersed in methylene chloride is washed with alkali and then separated. Subsequently, the organic phase is washed with 0.1 N solution of hydrochloric acid and then rinsed with distilled water 2 or 3 times. After rinsing is completed, the concentration of the organic phase dispersed in methylene chloride is adjusted constantly and granulation is conducted by using a constant amount of pure water at 30 to 100° C., preferably 60 to 80° C. If the temperature of the pure water is lower than 30° C., the granulation rate is low and thus the granulation time may be too long. If the temperature of the pure water is higher than 100° C., it may be difficult to obtain the polycarbonate in uniformly sized morphology. After granulation is completed, it is preferable to dry the product at 100 to 120° C. for 5 to 10 hours. More preferably, the product is dried at 100 to 110° C. for 5 to 10 hours first, and then at 110 to 120° C. for 5 to 10 hours.

EXAMPLES AND COMPARATIVE EXAMPLES

Example 1

Preparation of Hydroxy-Terminated Siloxane

In a 500 mL three-necked flask equipped with a condenser, 0.4 mol of monomer (BY16-799, Dow Corning) was dissolved in 300 mL of chloroform, and then 67 mL of triethylamine (TEA) catalyst was added thereto. Under refluxing of the resulting solution, 0.2 mol of terephthaloylchloride (TCL) dissolved in 1,000 mL of chloroform was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having ester linkage of the following chemical formula 6 (number average molecular weight, $M_n$: 3,300) was prepared. The synthesis was confirmed by H-NMR analysis wherein the peak of methylene group of the polysiloxane was observed at 2.6 ppm, the peak of hydrogen of benzene ring of TCL was observed at 8.35 ppm, and the peak of hydrogen of benzene ring of the polysiloxane was observed at 6.75-7.35 ppm.

[Chemical formula 6]

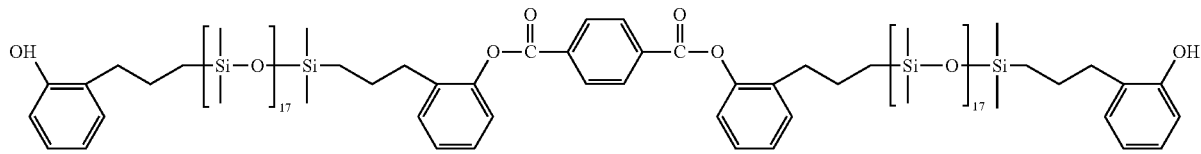

<Preparation of Polysiloxane-Polycarbonate Copolymer>

An interfacial reaction of bisphenol A in an aqueous solution and phosgene gas was conducted in the presence of methylene chloride to prepare 400 mL of an oligomeric polycarbonate mixture having a viscosity average molecular weight of about 1,000. To the obtained oligomeric polycarbonate mixture, 3% by weight of the hydroxy-terminated siloxane having ester linkage of chemical formula 6 which was dissolved in methylene chloride, 1.8 mL of tetrabutylammonium chloride (TBACl), 2.1 g of p-tert-butylphenol (PTBP) and 275 μl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 360 g of methylene chloride and 300 μl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times. After rinsing was completed, the organic phase was granulated by using a constant amount of pure water at 76° C. After granulation was completed, the product was dried first at 110° C. for 8 hours and then at 120° C. for 10 hours. The synthesis of the copolymer was confirmed by H-NMR analysis wherein the peaks of methylene group of the polysiloxane were observed at 2.6 ppm and 2.65 ppm, the peak of hydrogen of benzene ring of TCL was observed at 8.35 ppm, and the peak of hydrogen of benzene ring of the polysiloxane was observed at 6.95-7.5 ppm. The physical properties of the prepared polysiloxane-polycarbonate copolymer were measured, and the results are shown in Table 1 below.

Example 2

Preparation of Hydroxy-Terminated Siloxane

In a 100 mL three-necked flask equipped with a condenser, 0.03 mol of eugenol and 0.015 mol of polydimethylsiloxane were completely dissolved in 50 mL of chlorobenzene under nitrogen atmosphere, and then 0.00364 mmol of platinum catalyst (platinum(0)-1,3-divinyl-1,1,3,3-tetramethyldisiloxane complex) was added thereto. The resulting solution was then refluxed for 24 hours, and the solvent was removed therefrom. The product was washed with distilled water to obtain hydroxy-terminated siloxane of the following chemical formula 7 ($M_n$:8,044).

[Chemical formula 7]

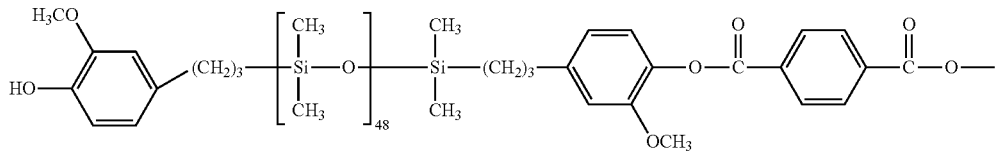

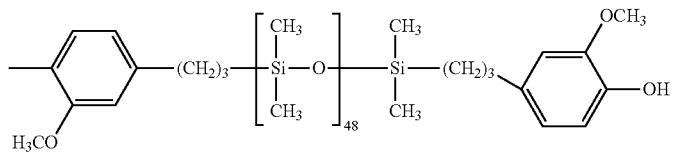

<Preparation of Polysiloxane-Polycarbonate Copolymer>

An interfacial reaction of bisphenol A in an aqueous solution and phosgene gas was conducted in the presence of methylene chloride to prepare 400 mL of an oligomeric polycarbonate mixture having a viscosity average molecular weight of about 1,000. To the obtained oligomeric polycarbonate mixture, 4.5% by weight of the hydroxy-terminated siloxane having ester linkage of chemical formula 7 which was dissolved in methylene chloride, 1.8 mL of tetrabutylammonium chloride (TBACl), 2.8 g of p-tert-butylphenol (PTBP) and 275 μl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 360 g of methylene chloride and 300 μl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times. After rinsing was completed, the organic phase was granulated by using a constant amount of pure water at 76° C. After granulation was completed, the product was dried first at 110° C. for 8 hours and then at 120° C. for 10 hours. The synthesis of the copolymer was confirmed by H-NMR analysis wherein the peaks of methylene group of the polysiloxane were observed at 2.6 ppm and 2.65 ppm, the peak of hydrogen of benzene ring of TCL was observed at 8.35 ppm, and the peak of hydrogen of benzene ring of the polysiloxane was observed at 6.95-7.5 ppm. The physical properties of the prepared polysiloxane-polycarbonate copolymer were measured, and the results are shown in Table 1 below.

Example 3

The polysiloxane-polycarbonate copolymer was prepared by the same method as described in Example 2, except that the hydroxy-terminated siloxane ($M_n$: 12,141) having ester linkage of the following chemical formula 8 was prepared and used in an amount of 4.5% by weight. The physical properties of the prepared polysiloxane-polycarbonate copolymer were measured, and the results are shown in Table 1 below.

[Chemical formula 8]

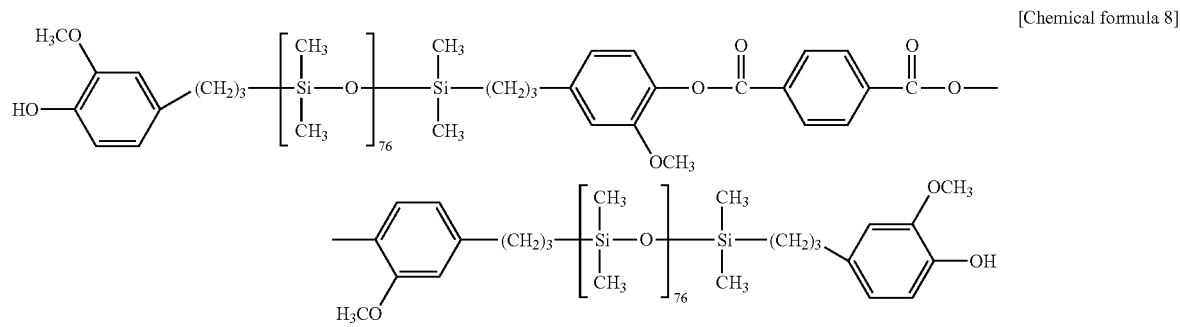

Example 4

The polysiloxane-polycarbonate copolymer was prepared by the same method as described in Example 2, except that the hydroxy-terminated siloxane ($M_n$:7,000) having ester linkage of the following chemical formula 9 was prepared and was used in an amount of 4.5% by weight, and 2.6 g of p-tert-butylphenol (PTBP) was used. The physical properties of the prepared polysiloxane-polycarbonate copolymer were measured, and the results are shown in Table 1 below.

[Chemical formula 9]

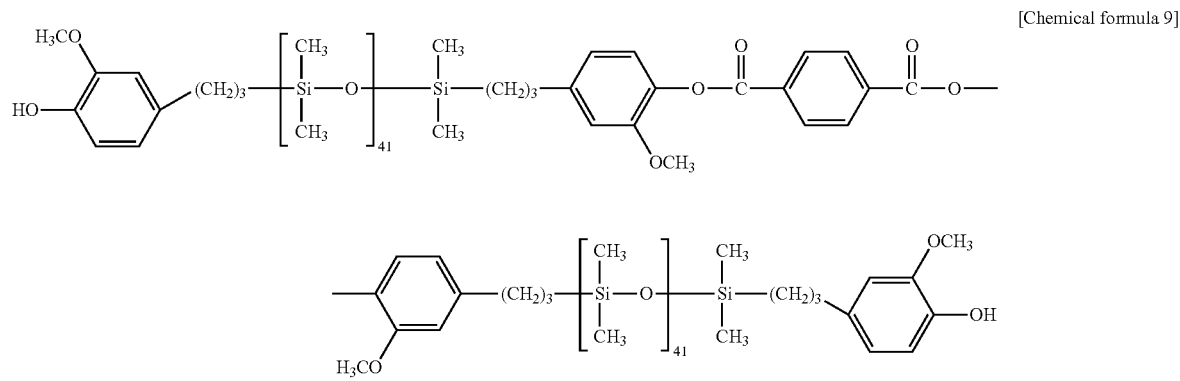

Example 5

Preparation of Hydroxy-Terminated Siloxane 0.0666 mol of monomer (BY16-752, Dow Corning) was dissolved in 100 mL of benzene under nitrogen atmosphere, and then 6.66 mmol of 1,4-diazabicyclo[2,2,2]-octane was added thereto. Under refluxing of the resulting solution, 0.0333 mol of 4,4-methylene bis(phenyl isocynate) dissolved in 200 mL of benzene was slowly added thereto for 1 hour, and the resulting solution was refluxed for 12 hours. After the reaction was completed, the solvent was removed from the resulting solution, and the product was dissolved in acetone and then washed with hot distilled water. By drying for 24 hours in a vacuum oven, the hydroxy-terminated siloxane having urethane linkage of the following chemical formula 10 ($M_n$:6,274) was prepared. The synthesis was confirmed by H-NMR analysis wherein the peak of hydrogen bound to the first carbon of the aliphatic chain adjacent to the terminal phenyl group in the following chemical formula 10 was observed at 2.75 ppm.

water at 76° C. After granulation was completed, the product was dried first at 110° C. for 8 hours and then at 120° C. for 10 hours. The synthesis was confirmed by H-NMR analysis wherein the peak of methylene group of the polysiloxane were observed at 2.65 ppm and the peak of hydrogen of benzene ring of the polysiloxane was observed at 7.1-7.5 ppm. The physical properties of the prepared polysiloxane-polycarbonate copolymer were measured, and the results are shown in Table 1 below.

[Chemical formula 10]

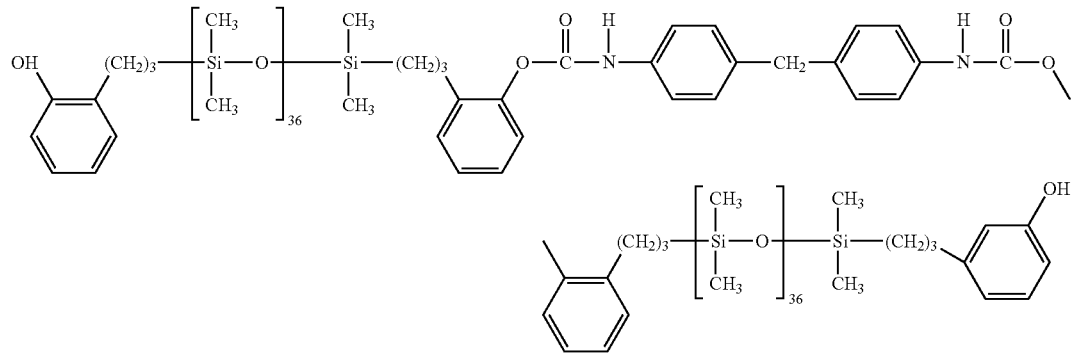

<Preparation of Polysiloxane-Polycarbonate Copolymer>

An interfacial reaction of bisphenol A in an aqueous solution and phosgene gas was conducted in the presence of methylene chloride to prepare 400 mL of an oligomeric polycarbonate mixture having a viscosity average molecular weight of about 1,000. To the obtained oligomeric polycarbonate mixture, 4.5% by weight of the hydroxy-terminated siloxane having urethane linkage of chemical formula 10 which was dissolved in methylene chloride, 1.8 mL of tetrabutylammonium chloride (TBACl), 2.6 g of p-tert-bu- Example 6

Preparation of Hydroxy-Terminated Siloxane

In a 500 mL three-necked flask equipped with a condenser, 0.01 mole of PMS-25 (Dami Polychem) was dissolved in 100 mL of toluene under nitrogen atmosphere, and then 0.01 mole of triethylamine (TEA) catalyst was added thereto. Under refluxing of the resulting solution, 0.005 mole of phenyl phosphonic dichloride was slowly added thereto for 1 hour, and the resulting solution was refluxed for 5 hours. After the reaction was completed, the toluene solvent was removed from the resulting solution, and the product was dried for 24 hours in a vacuum oven to obtain the phosphate-containing, hydroxy-terminated siloxane of the following chemical formula 11 ($M_n$: 5,500).

[Chemical formula 11]

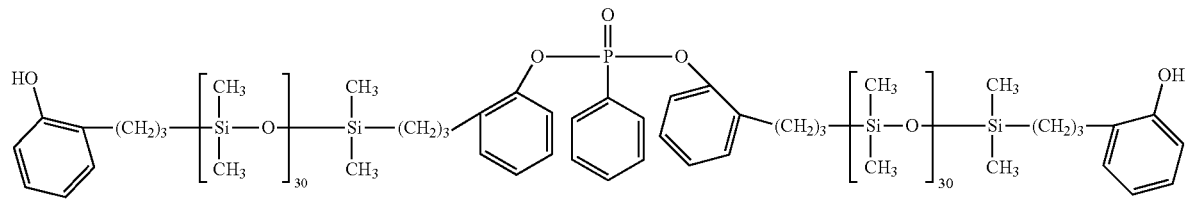

tylphenol (PTBP) and 275 µl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 370 g of methylene chloride and 300 µl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times. After rinsing was completed, the organic phase was granulated by using a constant amount of pure <Preparation of Polysiloxane-Polycarbonate Copolymer>

An interfacial reaction of bisphenol A in an aqueous solution and phosgene gas was conducted in the presence of methylene chloride to prepare an oligomeric polycarbonate mixture having a viscosity average molecular weight of about 1,000. The organic phase was collected from the prepared oligomeric polycarbonate mixture, and thereto 4.5% by weight of the phosphate-containing, hydroxy-terminated siloxane of chemical formula 11 which was dissolved in methylene chloride, 1.8 mL of tetrabutylammonium chloride (TBACl), 2.6 g of p-tert-butylphenol (PTBP) and 275 µl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 370 g of methylene chloride and 300 μl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times. After rinsing was completed, the organic phase was granulated by using a constant amount of pure water at 76° C. After granulation was completed, the product was dried first at 110° C. for 8 hours and then at 120° C. for 10 hours. The physical properties of the prepared polysiloxane-polycarbonate copolymer were measured, and the results are shown in Table 1 below.

Example 7

The polysiloxane-polycarbonate copolymer was prepared by the same method as described in Example 1, except that the hydroxy-terminated siloxane (BY16-752, Dow Corning, $M_n$:3,000) was used in an amount of 4.5% by weight. The physical properties of the prepared polysiloxane-polycarbonate copolymer were measured, and the results are shown in Table 1 below.

Comparative Example 1

The physical properties of a linear polycarbonate (3022PJ, $M_v$:21,000, Samyang Corporation) were measured, and the results are shown in Table 1 below.

Comparative Example 2

The physical properties of a linear polycarbonate (3030PJ, $M_v$: 31,200, Samyang Corporation) were measured, and the results are shown in Table 1 below.

Comparative Example 3

The physical properties of a linear polycarbonate synthesized to have a viscosity average molecular weight of 70,800 were measured, and the results are shown in Table 1 below.

Comparative Example 4

The polysiloxane-polycarbonate copolymer was prepared by the same method as described in Example 2, except that the hydroxy-terminated siloxane having ester linkage of the following chemical formula 12 ($M_n$:1,500) was prepared and used in an amount of 4.5% by weight, and 1.5 g of p-tert-butylphenol (PTBP) was used. The physical properties of the prepared polysiloxane-polycarbonate copolymer were measured, and the results are shown in Table 1 below.

[Chemical formula 12]

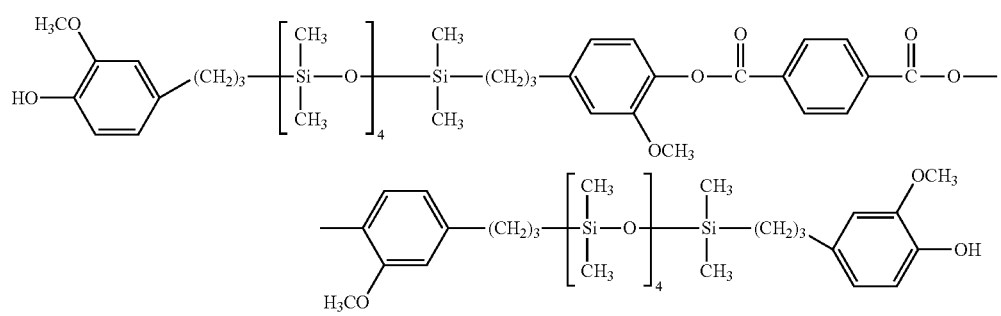

Comparative Example 5

The polysiloxane-polycarbonate copolymer was prepared by the same method as described in Example 4, except that the hydroxy-terminated siloxane having ester linkage of the following chemical formula 13 ($M_n$:2,108) was prepared and used in an amount of 4.5% by weight. The physical properties of the prepared polysiloxane-polycarbonate copolymer were measured, and the results are shown in Table 1 below.

[Chemical formula 13]

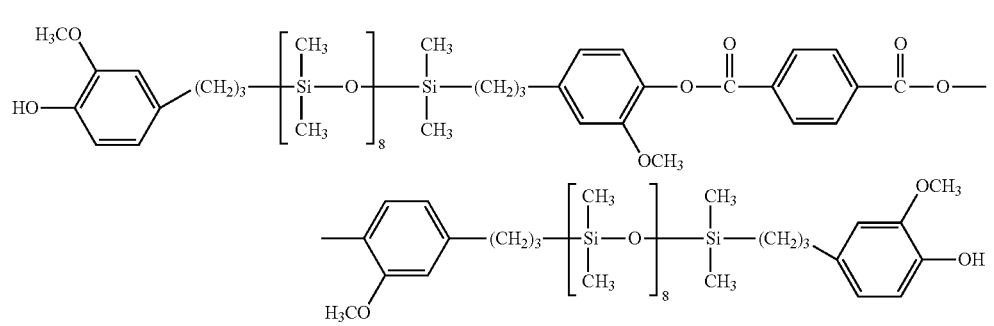

Comparative Example 6

The polysiloxane-polycarbonate copolymer was prepared by the same method as described in Example 5, except that the hydroxy-terminated siloxane having urethane linkage of the following chemical formula 14 ($M_n$:1,427) was prepared and used in an amount of 4.5% by weight. The physical properties of the prepared polysiloxane-polycarbonate copolymer were measured, and the results are shown in Table 1 below.

[Chemical formula 14]

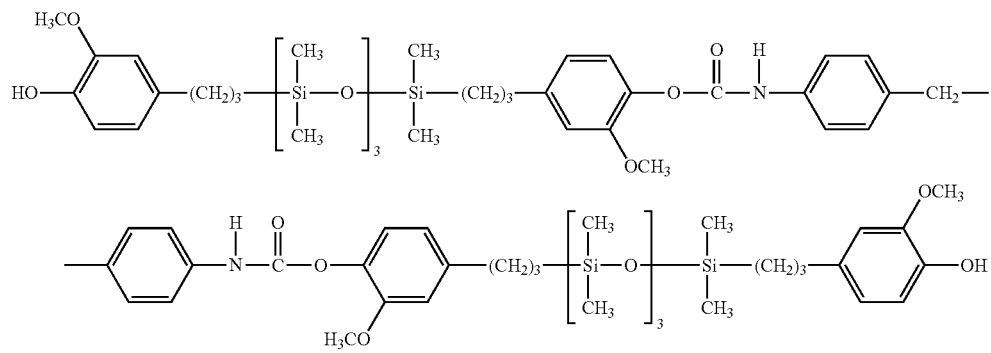

Comparative Example 7

The polysiloxane-polycarbonate copolymer was prepared by the same method as described in Example 6, except that the phosphate-containing, hydroxy-terminated siloxane of the following chemical formula 15 ($M_n$:1,300) was prepared and used in an amount of 4.5% by weight. The physical properties of the prepared polysiloxane-polycarbonate copolymer were measured, and the results are shown in Table 1 below.

[Chemical formula 15]

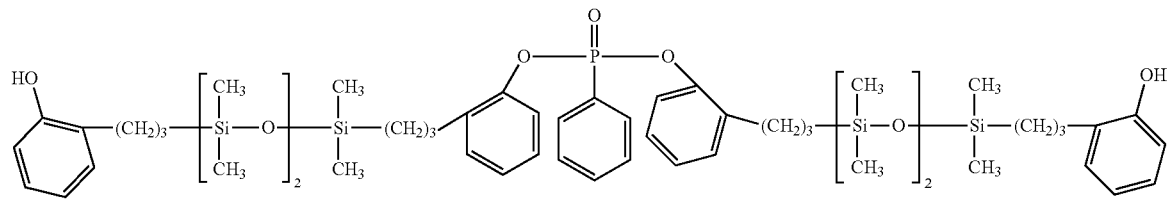

Comparative Example 8

The polysiloxane-polycarbonate copolymer was prepared by the same method as described in Example 1, except that the hydroxy-terminated siloxane (BY16-799, Dow Corning, Mn: 1,500) was used in an amount of 4.5% by weight. The physical properties of the prepared polysiloxane-polycarbonate copolymer were measured, and the results are shown in Table 1 below.

Comparative Example 9

The polysiloxane-polycarbonate copolymer was prepared by the same method as described in Example 2, except that the hydroxy-terminated siloxane having ester linkage of the following chemical formula 16 ($M_n$:17,158) was prepared and was used in an amount of 4.5% by weight. The physical properties of the prepared polysiloxane-polycarbonate copolymer were measured, and the results are shown in Table 1 below.

[Chemical formula 16]

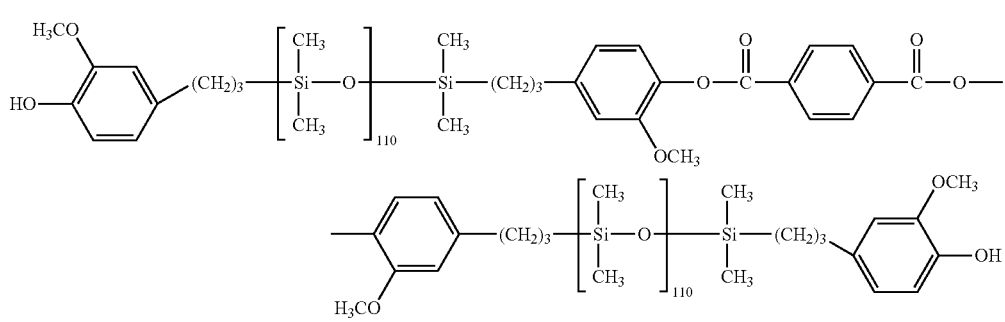

TABLE 1

| Properties | Examples | | | | | | |
|---|---|---|---|---|---|---|---|
| | 1 | 2 | 3 | 4 | 5 | 6 | 7 |
| Siloxane amount (wt %) | 3 | 4.5 | 4.5 | 4.5 | 4.5 | 4.5 | 4.5 |
| Molecular weight of siloxane ($M_n$) | 3300 | 8044 | 12141 | 7000 | 6274 | 5500 | 3000 |
| Molecular weight of copolymer ($M_v$) | 25000 | 19000 | 19200 | 21000 | 21300 | 20800 | 25000 |
| Impact strength    Room temperature (Kg cm/cm) | 79 | 71 | 74 | 82 | 78 | 81 | 79 |
| −50° C. | 40 | 51 | 56 | 65 | 61 | 59 | 59 |
| Ductility ratio under impact loading at −50° C. | 80 | 90 | 100 | 100 | 100 | 90 | 80 |
| M.I. (g/10 min) | 5 | 15 | 14 | 8.1 | 9 | 8.8 | 4 |

| Properties | Comparative Examples | | | | | | | | |
|---|---|---|---|---|---|---|---|---|---|
| | 1 | 2 | 3 | 4 | 5 | 6 | 7 | 8 | 9 |
| Siloxane amount (wt %) | 0 | 0 | 0 | 4.5 | 4.5 | 4.5 | 4.5 | 4.5 | 4.5 |
| Molecular weight of siloxane ($M_n$) | — | — | — | 1500 | 2108 | 1427 | 1300 | 1500 | 17158 |
| Molecular weight of copolymer ($M_v$) | 21000 | 31200 | 70800 | 30000 | 21000 | 21500 | 21100 | 25100 | 14300 |
| Impact strength    Room temperature (Kg cm/cm) | 80 | 80 | 92 | 83 | 75 | 77 | 80 | 79 | 13 |
| −50° C. | 10 | 20 | 35 | 20 | 23 | 20 | 21 | 22 | 8 |
| Ductility ratio under impact loading at −50° C. | 0 | 0 | 0 | 5 | 6 | 3 | 4 | 10 | 0 |
| M.I. (g/10 min) | 14 | 3 | 1 | 3 | 8.9 | 9.2 | 8.9 | 5 | 30 |

As shown in Table 1 above, the polysiloxane-polycarbonate copolymers prepared according to the Examples showed generally superior low-temperature impact resistance (40 kg cm/cm or more) and ductility ratio (80% or more), as compared with those of the polysiloxane-polycarbonate copolymers prepared according to (or the linear polycarbonates used in) the Comparative Examples. For example, the copolymer of Example 1 had a much smaller viscosity average molecular weight than the polycarbonate of Comparative Example 3 and had a smaller viscosity average molecular weight and a smaller amount of siloxane than the copolymer of Comparative Example 4, but it showed the greater low-temperature impact resistance, ductility ratio and M.I. value. In addition, the copolymer of Example 1 had a smaller amount of siloxane than the copolymer of Comparative Example 5, but it showed the greater low-temperature impact resistance and ductility ratio.

The method for measuring the above properties used in the Examples and the Comparative Examples were as follows.

(a) H-NMR (nuclear magnetic resonance spectroscopy): This analysis was conducted by using Avance DRX 300 (Bruker).

(b) Viscosity average molecular weight ($M_v$): The viscosity of methylene chloride solution was measured by using an Ubbelohde Viscometer at 20° C., and the limiting viscosity [η] therefrom was calculated according to the following equation.

$$[\eta]=1.23\times10^{-5}Mv^{0.83}$$

(c) Impact strength: Impact strength was measured by using an impact test machine (RESIL IMPACTOR, CEAST Co., Ltd.) at room temperature and −50° C.

(d) Ductility ratio measured under impact loading at −50° C. (flexibility ratio): The ductility ratio was calculated according to the following equation.

Ductility ratio=Ductility of specimen/Ductility of all specimens*100%

(e) Melt Index (M.I.): The melt index, which indicates flowability under certain temperatures and loads, and was measured at 300° C. under a load of 1.2 kg, in accordance with ASTM D1238.

The present invention has been described with reference to concrete examples. A person skilled in the art would understand that the present invention can be realized as a modified form within a scope not departing from the essential characteristics of the present invention. Accordingly, the disclosed examples must be considered in their illustrative aspect and not their limitative aspect. The scope of the present invention is shown not in the aforesaid explanation but in the appended claims, and all differences within a scope equivalent thereto should be interpreted as being included in the present invention.

The invention claimed is:

1. A polysiloxane-polycarbonate copolymer comprising, as repeating units, a hydroxy-terminated siloxane of the following chemical formula 1a or chemical formula 1 and a polycarbonate block of the following chemical formula 4, wherein the number average molecular weight ($M_n$) of the hydroxy-terminated siloxane is from 2,500 to 15,000;
a viscosity average molecular weight (Mv) of the polysiloxane-polycarbonate copolymer is 15,000 to 25,000; and
the viscosity average molecular weight (Mv) is measured by measuring the viscosity of methylene chloride solution with an Ubbelohde Viscometer at 20° C. and calculating a limiting viscosity $[\eta]$ according to the equation, $[\eta]=1.23\times10^{-5} \, Mv^{0.83}$, chemical formula 1a

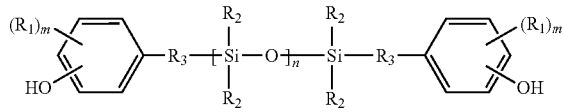

wherein, in chemical formula 1a,
$R_1$ independently represents hydrogen atom, halogen atom, hydroxy group, or alkyl group, alkoxy group or aryl group having 1 to 20 carbon atoms;
$R_2$ independently represents hydrocarbon group having 1 to 13 carbon atoms or hydroxy group;
$R_3$ independently represents alkylene group having 2 to 8 carbon atoms;
m independently represents an integer of 0 to 4; and
n represents an integer of 30 to 200;

chemical formula 1

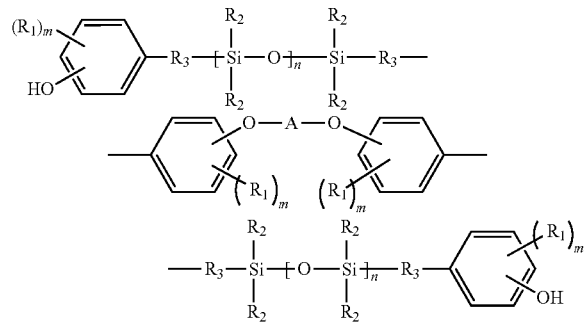

wherein, in chemical formula 1,
$R_1$ independently represents hydrogen atom, halogen atom, hydroxy group, or alkyl group, alkoxy group or aryl group having 1 to 20 carbon atoms;
$R_2$ independently represents hydrocarbon group having 1 to 13 carbon atoms or hydroxy group;
$R_3$ independently represents alkylene group having 2 to 8 carbon atoms;
m independently represents an integer of 0 to 4;

n independently represents an integer of 15 to 100; and
A represents a structure of the following chemical formula 2 or 3;

Chemical formula 2

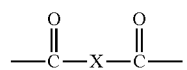

wherein, in chemical formula 2,
X is Y or NH—Y—NH, wherein, Y represents linear or branched aliphatic group having 1 to 20 carbon atoms, cycloalkylene group, or mono- or polycyclic arylene group having 6 to 30 carbon atoms and being unsubstituted or substituted with halogen atom, alkyl group, alkoxy group, aryl group or carboxy group;

chemical formula 3

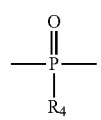

wherein, in chemical formula 3,
$R_4$ represents an aromatic hydrocarbon group or aromatic/aliphatic mixed-type hydrocarbon group having 6 to 30 carbon atoms, or an aliphatic hydrocarbon group having 1 to 20 carbon atoms;

chemical formula 4

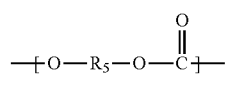

wherein, in chemical formula 4,
$R_5$ represents aromatic hydrocarbon group having 6 to 30 carbon atoms that is unsubstituted or substituted with alkyl group, cycloalkyl group, alkenyl group, alkoxy group, halogen atom or nitro.

2. The polysiloxane-polycarbonate copolymer according to claim 1, wherein the amount of the hydroxy-terminated siloxane in the polysiloxane-polycarbonate copolymer is from 1 to 10% by weight.

3. A method for preparing the polysiloxane-polycarbonate copolymer of claim 1, the method comprising:
a step of mixing a hydroxy-terminated siloxane having a number average molecular weight of 2,500 to 15,000 and an oligomeric polycarbonate, and reacting them under an interfacial reaction condition to form a polysiloxane-polycarbonate intermediate; and
a step of polymerizing the intermediate by using a first polymerization catalyst to prepare the polysiloxane-polycarbonate copolymer having a viscosity average molecular weight (Mv) of 15,000 to 25,000,
wherein the viscosity average molecular weight (Mv) is measured by measuring the viscosity of methylene chloride solution with an Ubbelohde Viscometer at 20° C. and calculating a limiting viscosity $[\eta]$ according to the equation, $[\eta]=1.23\times10^{-5} \, Mv^{0.83}$.

4. The method for preparing the polysiloxane-polycarbonate copolymer according to claim 3, wherein the oligomeric polycarbonate has a viscosity average molecular weight of 800 to 20,000.

5. The method for preparing the polysiloxane-polycarbonate copolymer of claim 3, wherein the viscosity average molecular weight (Mv) of the polysiloxane-polycarbonate copolymer is 17,000 to 22,000.

6. The polysiloxane-polycarbonate copolymer according to claim 1, wherein the viscosity average molecular weight (Mv) of the polysiloxane-polycarbonate copolymer is 17,000 to 22,000.

7. The polysiloxane-polycarbonate copolymer according to claim 6, wherein the amount of the hydroxy-terminated siloxane in the polysiloxane-polycarbonate copolymer is from 1 to 10% by weight.

* * * * *